No. 867,208. PATENTED SEPT. 24, 1907.
R. S. McINTYRE.
SPROCKET CHAIN.
APPLICATION FILED JUNE 12, 1907.
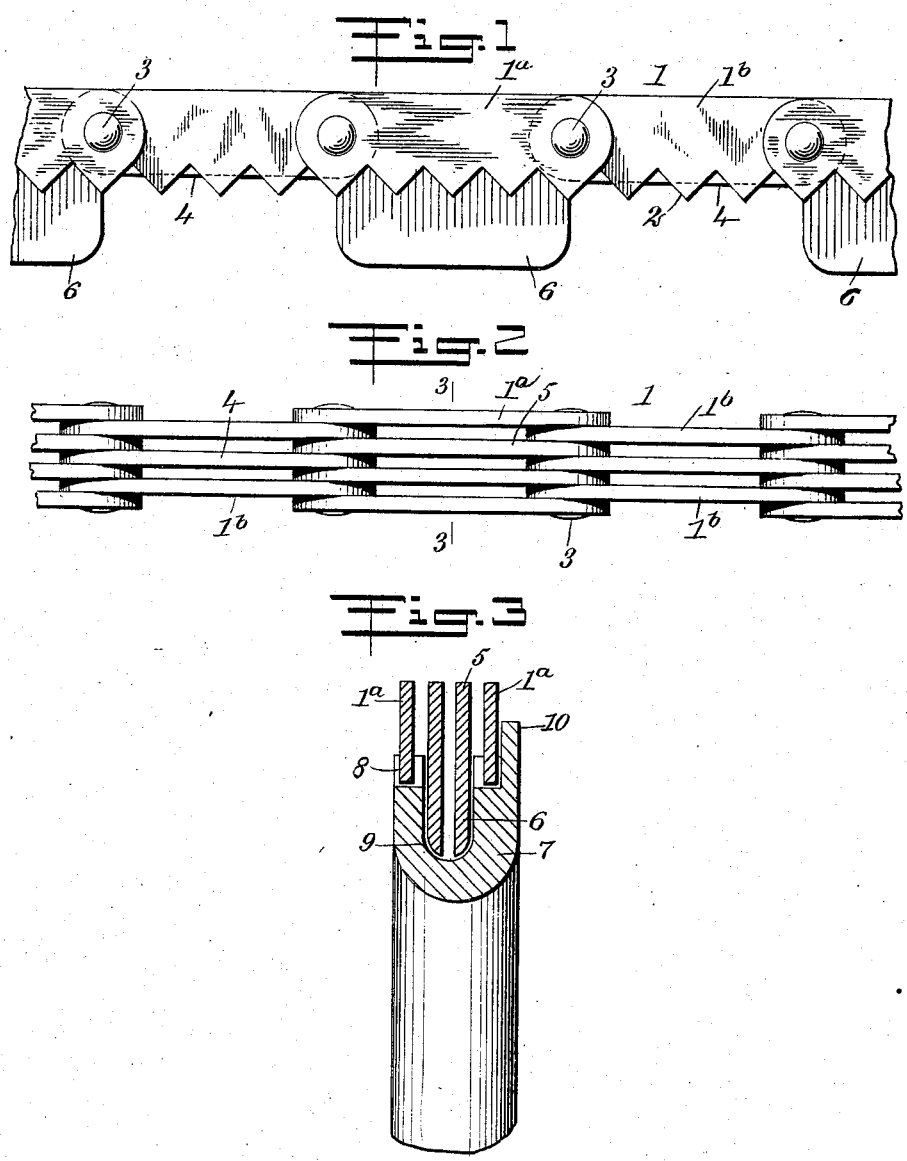

UNITED STATES PATENT OFFICE.

ROBERT SAFFORD McINTYRE, OF RIVERSIDE, CALIFORNIA.

SPROCKET-CHAIN.

No. 867,208.   Specification of Letters Patent.   Patented Sept. 24, 1907.

Original application filed February 23, 1905, Serial No. 246,871. Divided and this application filed June 12, 1907. Serial No. 378,492.

*To all whom it may concern:*

Be it known that I, ROBERT SAFFORD McINTYRE, a citizen of the United States, and a resident of Riverside, in the county of Riverside and State of California, have invented a new and Improved Sprocket-Chain, of which the following is a full, clear, and exact description.

This invention relates to a sprocket chain, and the present specification is a division of the original specification claiming this invention, filed by me February 23, 1905, Serial No. 246,871.

The object of the invention is to produce a sprocket chain of simple form, which is constructed with a special view to preventing its becoming dislodged from the sprocket wheels over which it runs, without in any way detracting from the efficiency of the chain in operation.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a short portion of a chain constructed according to my invention; Fig. 2 is a plan view of the parts of the chain shown in Fig. 1; and Fig. 3 is a cross section through the chain, taken on the line 3—3 of Fig. 2, and showing, also, a portion of a gear wheel with which the chain coöperates.

Referring more particularly to the parts, 1 represents the sprocket links; these links are formed on their under sides with V-shaped sprocket teeth 2 that are connected together to form a continuous chain in which the links are arranged in pairs alternately within and without each other, as indicated, the ends of the links being connected by pivot pins or bolts 3. In this way the sprocket links are divided into two sets.

1ᵃ represents the sets of those links which are disposed on the outside, while 1ᵇ represents the links which are disposed on the inside of the others. Between the links 1ᵇ, plain links 4 are provided, which are not provided with teeth. These links 4 are disposed centrally between the links 1ᵇ; their ends are fastened to the pins 3 between guide links or guide plates 5. These guide plates are fastened in the chain like links, but are provided with downwardly projecting fins 6, as indicated most clearly in Figs. 1 and 3.

A chain constructed as described, is adapted to be used with a sprocket wheel 7 having the form shown in Fig. 3. This sprocket wheel is formed with two circumferential rows of teeth 8 which are disposed slightly apart and between which there is formed a circumferential groove 9 passing continuously around the wheel. At one side the wheel is provided with an outwardly projecting guard or flange 10. The teeth 8 of the sprocket wheel are in alinement with the teeth 2 of the sprocket links, so that the chain may run over the sprocket wheel in the manner indicated in Fig. 3; in this way the fins 6 project down into the groove 9, and prevent any possibility of the chain being dislodged by a lateral movement of the sprocket wheel. In this way a very simple chain is formed which will transmit the driving force, but which cannot become accidentally dislodged from its position. A chain of this description is especially adapted for transmitting the power of automobiles or similar vehicles.

Having thus described my invention, I claim as new and desire to secure by Letters Patent:

1. A sprocket chain having sprocket links with teeth formed on the edges thereof adapted to engage the sprocket teeth of a sprocket wheel, and intermediate guide links projecting downwardly beyond said teeth and adapted to be received in a guide groove in the sprocket wheel, said guide links affording means for preventing the dislodgment of the chain.

2. A sprocket chain composed of sprocket links disposed in pairs alternately attached outside and inside of each other, said sprocket links having teeth on their edges adapted to engage the teeth of a sprocket wheel, guide links disposed between alternate pairs of said sprocket links and projecting beyond the teeth of said sprocket links, said guide links being adapted to lie in a groove formed in the sprocket wheel to prevent the dislodgment of the chain.

3. A sprocket chain having sprocket links disposed in pairs attached alternately outside and inside of each other, guide links disposed in pairs and disposed between the members of the outside sprocket links, said guide links having fins projecting beyond the teeth of said sprocket links, adapted to run in the groove formed on the sprocket wheel, and plain links lying between the inside links.

In testimony whereof I have signed my name to this specification in the presence of two subscribing witnesses.

ROBERT SAFFORD McINTYRE.

Witnesses:
 LAFAYETTE GILL,
 F. G. HALL.